United States Patent [19]

Cerny et al.

[11] Patent Number: 5,405,296
[45] Date of Patent: Apr. 11, 1995

[54] TORSIONAL VIBRATION DAMPER

[75] Inventors: Zdenek Cerny, Brampton; Michael Clark, New Market, both of Canada

[73] Assignee: Tesma International Inc., Concord, Canada

[21] Appl. No.: 174,455

[22] Filed: Dec. 28, 1993

[51] Int. Cl.⁶ .............................................. F16H 7/08
[52] U.S. Cl. ................................................... 474/135
[58] Field of Search ........................ 474/101, 133–138, 474/113–117

[56] References Cited

U.S. PATENT DOCUMENTS

| | | | |
|---|---|---|---|
| 5,030,172 | 7/1991 | Green et al. | 474/135 |
| 5,057,059 | 10/1991 | Sidwell et al. | 474/135 |
| 5,129,864 | 7/1992 | Quintus et al. | 474/135 |

*Primary Examiner*—Michael Powell Buiz
*Attorney, Agent, or Firm*—Cushman, Darby & Cushman

[57] ABSTRACT

A vibration damper assembly operatively connecting a driving pulley with an automotive engine output shaft which drives a serpentine belt system with an automatic belt tensioner. The vibration damper assembly serves to dampen torsional, bending, and transitional vibrations transmitted from the output shaft through the poly-V belt and engine frame to the belt tensioner. The vibration damper assembly comprises a mounting element, fixed to the output shaft, in torsional transmitting relation therewith, bearing member operatively disposed between the driving pulley and the mounting element to restrict relative movement therebetween to torsional relative movement, and a resilient member operatively connected between the driving pulley and the mounting element in resilient torsional transmitting relation therebetween.

21 Claims, 3 Drawing Sheets

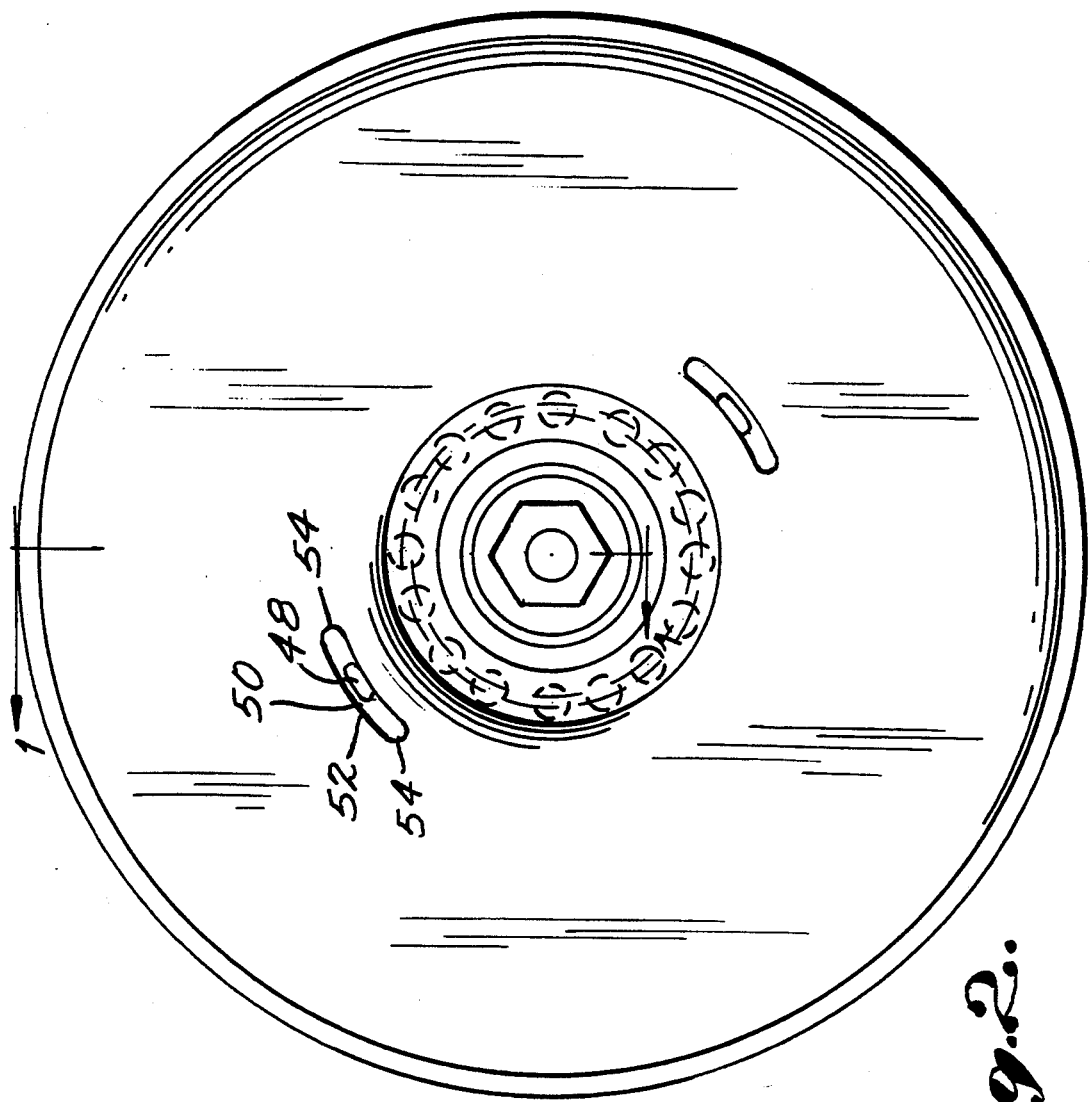
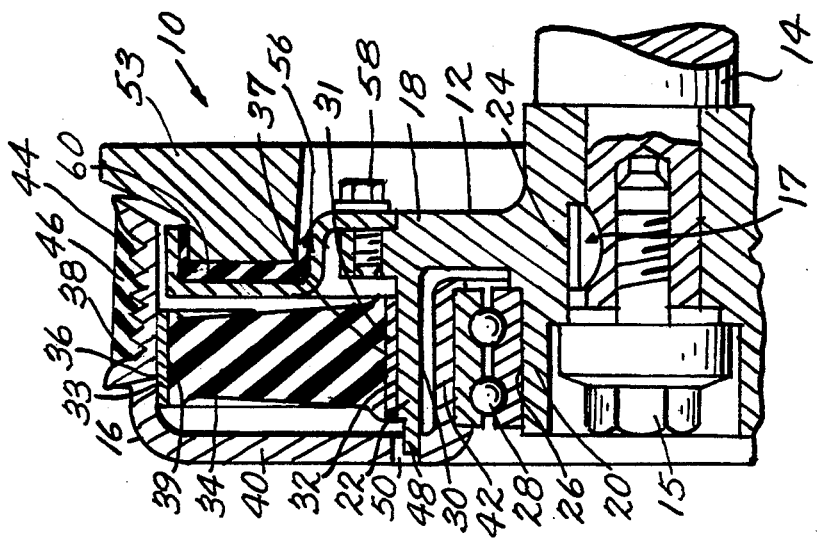
Fig. 1.
Fig. 2.

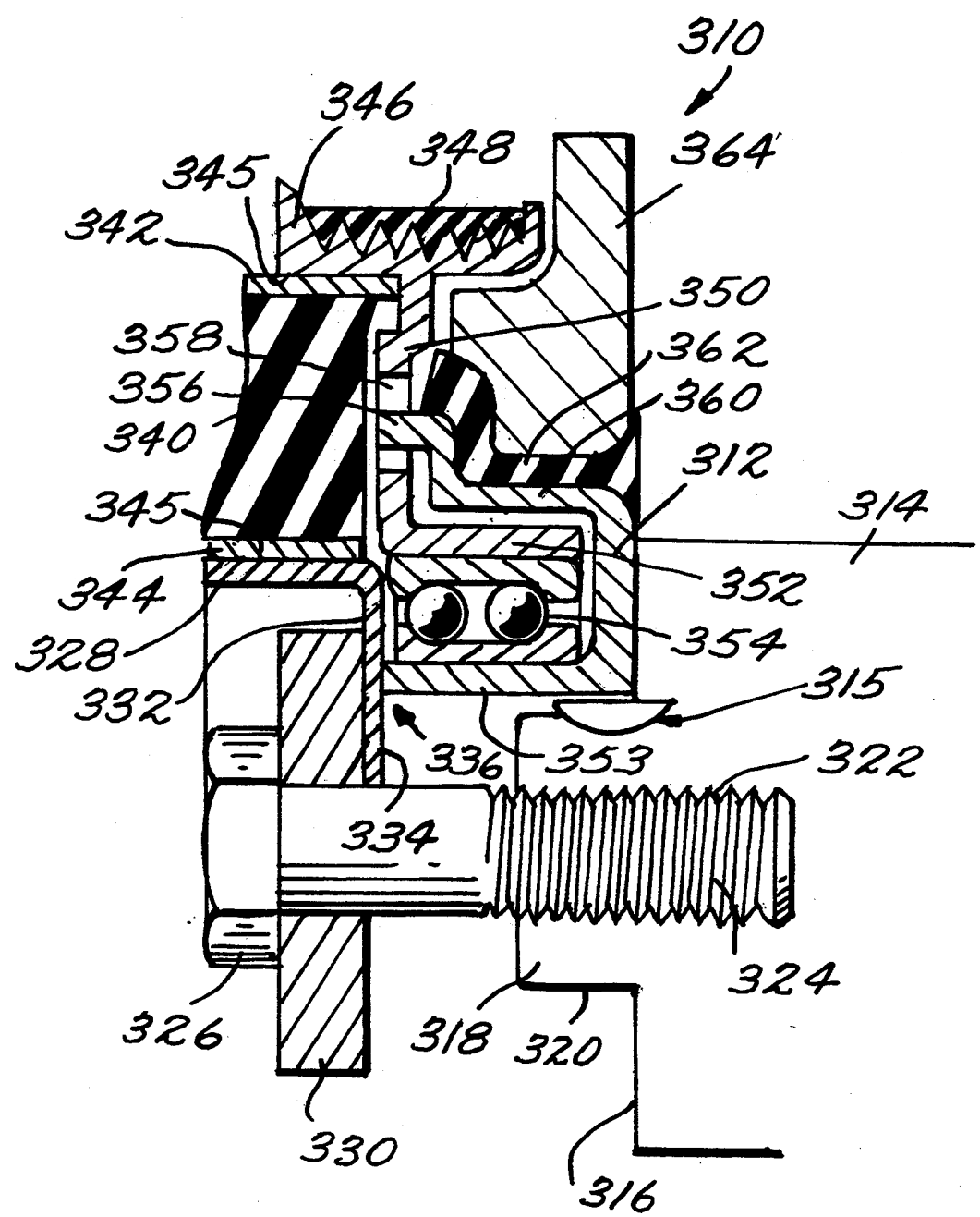

TORSIONAL VIBRATION DAMPER

This invention relates generally to serpentine belt systems for automotive vehicles and more particularly to vibration damping improvements for extending the useful life of the belt tensioner of the system.

In recent years, it has been found desirable to replace the conventional multiple individual belt system with a system embodying a single belt arranged in serpentine fashion to drive all of the multiple rotary instruments heretofore driven by separate belts. Most of the single serpentine belt systems thus far utilized have included a separate belt tensioning device both as an essential to the proper functioning of the system and as a means to simplify the mounting and tensioning of the belt in operative relation therewith.

A common type of belt tensioner embodies a fixed structure and a pivoted structure in the form of an arm carrying a belt engaging pulley pivoted to the fixed structure by a pivot assembly. A coil spring is mounted between the fixed structure and the pivoted structure and has its ends connected between the fixed and pivoted structures so as to bias the latter into tensioning engagement with the poly-V belt to maintain the poly-V belt in driven engagement with the driving pulleys and in driving engagement with the driven pulleys. It can be appreciated that long-term oscillations of the belt tensioner arm about its pivotal axis can have a deleterious effect on the interaction of components within the tensioner and the ability of the tensioner mechanism to maintain constant tension within the poly-V belt.

While belt tensioners are well-known devices and have been utilized in many belt systems, the requirements placed upon belt tensioners utilized in serpentine single belt automotive systems are particularly stringent. These requirements stem from a combination of factors including the relatively greater belt length utilized and hence the relatively greater belt take-up capacity required. In addition, significant wear of the belt tensioner is caused by extensive oscillations of the tensioner about its pivotal axis as a result of vibrations, resultant from varying rotational speed of the engine, imparted to the tensioner through the engine crankshaft, poly-V belt and engine frame. Such vibrations include "torsional" vibrations caused by twisting of the crankshaft in conjunction with the firing pressures of the pistons every combustion cycle, and "bending" vibrations of the crankshaft caused by momentary deflections of the crankshaft in response to such firing pressures. These vibrations reach particularly high levels when the natural frequencies of the crankshaft/poly-V belt/pulley system match the high amplitude of the engine firing forces over the normal operating speed of the engine. In addition, instantaneous tightening and loosening of the poly-V belt resulting from the changing rotational speeds of the crankshaft causes harmful "transitional" vibrations to be imparted to the belt tensioner. Therefore, there exists a need for a serpentine belt system having a torsional/bending/transitional vibration damper (hereinafter termed torsional vibration damper for simplicity) which will effectively address the aforementioned problems and enable the belt tensioner to function properly over an extended period of time.

It is an object of the present invention to fulfill the need expressed above. In accordance with the principles of the present invention, this objective is achieved by providing the combination including an internal combustion engine having an engine frame and an output shaft rotatable by operation of the internal combustion engine, the output shaft being subject to torsional and bending vibrations resulting from the operation of the internal combustion engine. In the combination, a plurality of driven shafts are mounted for rotational movement about parallel axes fixed with respect to the engine frame, and a plurality of driven pulleys are operatively connected with the driven shafts. A driving pulley is operatively connected with the output shaft. An endless flexible poly-V belt is trained about the driven and driving pulleys, the poly-V belt being subject to transitional vibrations from changing rotational speeds of the crankshaft. The combination further comprises a belt tensioner carried by the engine frame in tensioning engagement with the poly-V belt for maintaining the poly-V belt in driven engagement with the driving pulley and in driving engagement with the driven pulleys. Finally, a vibration damper assembly is provided to operatively connect the driving pulley with the output shaft for damping the torsional vibrations, the bending vibrations, and the transitional vibrations transmitted from the output shaft through the poly-V belt and the engine frame to the belt tensioner. The vibration damper comprises a mounting element, fixed to the output shaft, in torsional transmitting relation therewith, a bearing means operatively disposed between the driving pulley and the mounting element to restrict relative movement therebetween to torsional relative movement, and a resilient member operatively connected between the driving pulley and the mounting element in resilient torsional transmitting relation therebetween.

Since rotation of the output shaft, in conjunction with the driving pulley and poly-V belt, rotationally drives the driven pulleys and driven shafts, the driven shafts also become a source of torsional, bending, and transitional vibrations. Therefore, the aforementioned problems of the belt tensioner can be further alleviated by providing a damping assembly on the driven shafts as well.

It is a further object of the invention to provide a back-up means for providing torsional transmission between the mounting element and the driving pulley in the event that the resilient member fails in its torsional transmission.

These and other objects of the present invention will become more apparent during the course of the following detailed description and appended claims.

The invention may best be understood with reference to the accompanying drawings wherein illustrative embodiments are shown.

BRIEF DESCRIPTION OF THE DRAWINGS

FIG. 1 is a vertical sectional view of a torsional vibration damper embodying the principles of the present invention.

FIG. 2 is a lefthand side elevational view of the torsional vibration damper shown in FIG. 1.

FIG. 5 is a vertical sectional view of a second embodiment of the torsional vibration damper of the present invention.

Figure 3:
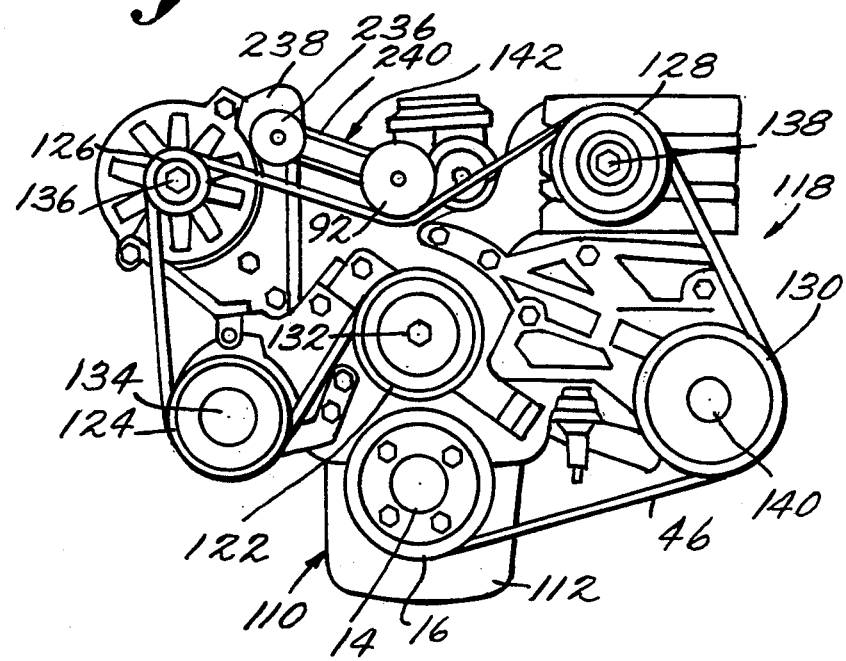
FIG. 3 is a schematic view of an automotive internal combustion engine serpentine belt system including a torsional vibration damper embodying the principles of the present invention.

Referring now more particularly to FIG. 1 of the drawings, there is shown therein a torsional vibration damper, generally indicated at 10, which is constructed in accordance with the principles of the present invention. As shown, the torsional vibration damper 10 includes a mounting element or hub 12 adapted to be mounted on the forward end of an engine crankshaft 14 and which serves as a mount for a pulley, indicated generally at 16, and provides an axis of rotation. Hub 12 is secured to crankshaft 14 by means of a bolt 15 and has a radially extending annular wall portion 18 integrally connecting two concentric axially outwardly extending cylindrical portions 20 and 22. As can be appreciated, generally indicated at 17 is a conventional key/keyway assembly for predetermining the fixed angular position of the torsional vibration damper on the crankshaft 14. Cylindrical portion 20 is disposed radially inward from cylindrical portion 22 and has an inner surface 24 which is adapted to be mounted to crankshaft 14 and an outer surface 26 which serves as a seat for a bearing element 28. Cylindrical portion 22 includes an inner peripheral cylindrical surface 30 and an outer surface 32. A resilient member 34 is annularly disposed about cylindrical portion 22. While resilient member 34 is preferably made of rubber, any elastomer may be used. Rings 31 and 33 made of a rigid material, preferably metal, are respectively disposed about the inner surface 37 and outer surface 39 of resilient member 34. While rings 31 and 33 made of relatively rigid material are compression fitted about resilient member 34 by compression of resilient member 34 between the rings, the rings may also be fixed to the resilient member by bonding of the resilient member at the metal-rubber interface.

A cylindrical poly-V belt engaging portion 38, having an inner surface 36, of pulley 16 is disposed about ring 33. Inner surface 36 is torsionally fixed to ring 33 just as outer surface 32 of cylindrical portion 22 is torsionally fixed to ring 31.

Another alternative method of torsional fixing of resilient member 34 to cylindrical portions 22 and 38 is either mechanical, chemical, thermal or thermochemical bonding directly to surface 32 and 36.

Pulley 16 has an outer peripheral cylindrical surface having a poly-V configuration 44 adapted to engage endless flexible poly-V belt 46. Pulley 16 includes radially extending annular disk portion 40, extending radially inwards from and integrally connecting cylindrical poly-V belt engaging portion 38 with cylindrical bearing engaging portion 42. Bearing engaging portion 42 extends from disk portion 40 axially inwardly between cylindrical portions 20 and 22 of hub 12 and rests upon bearing element 28.

Hub 12 receives torsional rotation from crankshaft 14 as a result of the operation of an internal combustion engine. Resilient member 34, which is operatively connected between hub 12 and pulley 16 resiliently transmits torsional rotation from hub 12 to pulley 16. Bearing element 28 restricts relative movement between pulley 16 and hub 12 to torsional relative movement. It can be appreciated, however, that the relative movement between hub 12 and pulley 16 is rather slight and occurs mostly when there is large transitions in the operating speed of output shaft 14. During such transitions, resilient member 34 effectuates what may be deemed a slight rotational "lag" of the pulley 16 with respect to the hub 12 so as to alleviate the yanking or transitional vibratory effect on poly-V belt 46. Resilient member 34, operating in conjunction with bearing element 28 also serves to absorb torsional vibrations of shaft 14 transmitted through hub 12. As a result, poly-V belt 46 is further relieved of these vibrations.

Cylindrical portion 22 has a protruding portion 48 which protrudes through slot 50 in disk portion 40 of pulley 16. As shown more clearly in FIG. 2, slot 50 has an edge 52. Protruding portion 48 is held in a spatially separated relation from side portions 54 of edge 52 by resilient member 34. Even accounting for the lag between pulley 16 and hub 12 during high acceleration or deceleration of output shaft 14, protruding portion 48 is prevented from engaging side portions 54. However, in instances of failure of resilient member 34, such as a cracking or tearing, protruding portion 48 is permitted to engage side portions 54 so that hub 12 continues to be in torsional transmitting relation with pulley 16. In effect, protruding portion 48 in conjunction with edge 52 of slot 50 serves as a direct drive back-up should resilient member 34 fail.

Referring now back to FIG. 1, a mass element 53 is shown annularly disposed about hub 12 and is connected thereto by a radially extending annular retaining element 56. Retaining element 56 may be integrally formed with hub 12, but in the most preferred embodiment, retaining element 56 is fixed to hub 12 by bolts 58 (only one bolt is shown in the figure). Similarly, while mass element 53 may be formed integral with hub 12 and/or retaining element 56, in the described embodiment, a radially extending elastic member 60, preferably made of rubber, adhesively secures mass element 53 with retaining element 56. This elastic member 60 in conjunction with mass element 53 is used for tuning the dampening of engine crankshaft bending vibration that is caused by firing pressure on engine pistons during combustion cycles. It can be appreciated that the specific configuration of elastic member 60 is operable to tune bending vibrations. As elastic member 60 is shifted from its radially extending configuration to an axially extending configuration, however, (for example, see elastic member 362 in FIG. 5), less bending vibrations are damped, and torsional vibrations are then primarily tuned and damped. The damping of such vibrations not only reduces torsional and bending stresses within the crankshaft during operation of the combustion engine.

Referring now to FIG. 3 an automotive internal combustion engine, generally indicated at 110, which includes an engine frame 112 and crankshaft 14. Fixed to the crankshaft 14 is pulley 16 forming a part of a serpentine belt system, generally indicated at 118. The belt system 118 includes an endless poly-V belt 46. The poly-V belt 46 is of the thin flexible type. The poly-V belt 46 is trained about the pulley 16 and a plurality of further pulleys 122, 124, 126, 128, and 130 each of which is fixed to respective shafts 132, 134, 136, 138 and 140. The shafts are connected to operate various engine accessories. For example, shaft 132 drives a water pump, shaft 134 a power steering pump, shaft 136 an alternator, shaft 138 an air injection pump, and shaft 140 a compressor of an air conditioning system for the automobile utilizing the engine 110.

It will be understood that the internal combustion engine 110 may be of any known construction. In accordance with conventional practice, the operation of the engine is such as to impart vibratory forces to the engine frame 112. All of the accessories are mounted on the engine frame 112 so that the shafts are rotated about parallel axes which are fixed with respect to the engine frame 112 and parallel with the output shaft 16 thereof.

The poly-V belt 46 is tensioned by a belt tensioner, generally indicated at 142. The belt tensioner 142 is also mounted on the engine frame 112. It will be understood that the engine frame 112 is mounted on the chassis of the automotive vehicle through appropriate shock absorbing mounts which serve to isolate the vibratory forces which are established by the operation of the internal combustion engine from the vehicle frame but not from the engine frame. The torsional vibratory forces which are established by the operation of the internal combustion engine 110 and torsional rotation of crankshaft 14 to which the pulley 16 is subjected are transmitted to the belt tensioner 42 through poly-V belt 120. In addition, momentary deflections of the crankshaft 14 may be imparted to the belt tensioner 142 through vibrations of the engine frame 112 itself.

Figure 4:
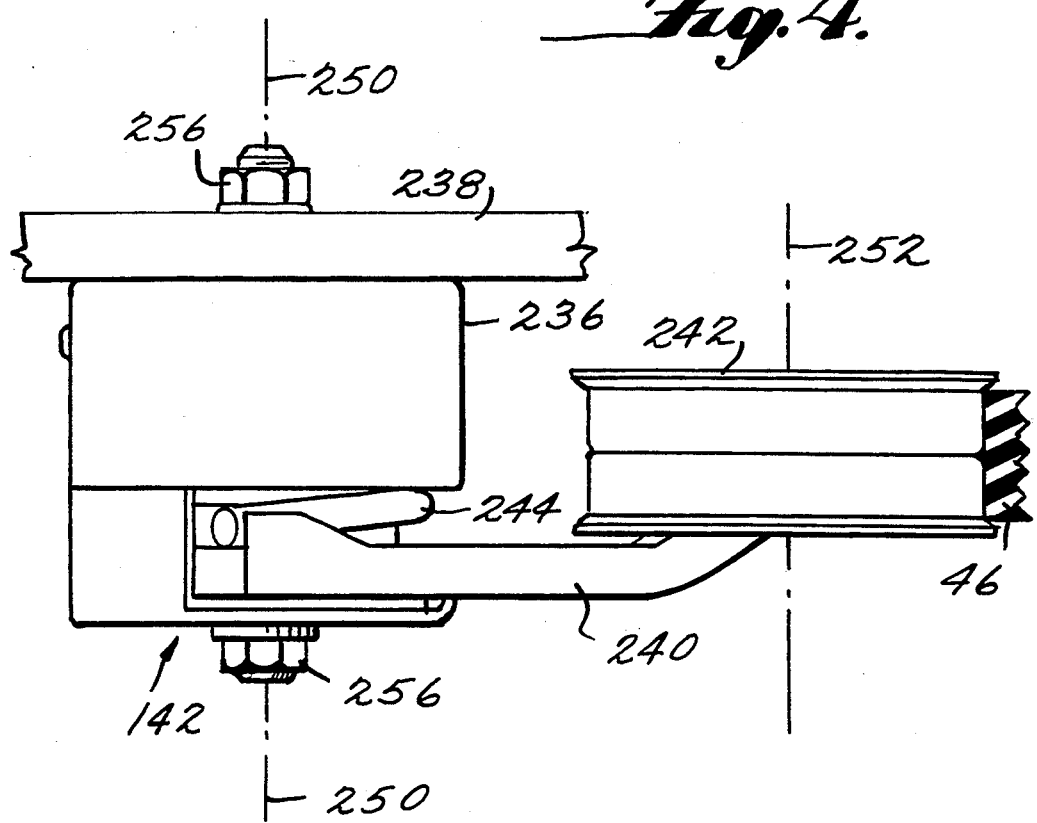
FIG. 4 is an overhead schematic view of the belt tensioner shown in FIG. 1.

Referring more particularly to FIG. 4 of the drawings, the belt tensioner 142 of the present invention includes a fixed structure 236 which is adapted to be secured, via bolt 256, to a bracket plate 238 or the like in a stationary position with respect to the engine block. The belt tensioner also includes a pivoted structure 240 which is mounted with respect to the fixed structure 236 for a pivotal movement about a fixed pivotal axis, indicated by phantom line 250. The pivoted structure 240 carries a belt engaging tensioner pulley 242 for rotational movement about rotational axis indicated at phantom line 252, parallel with the pivotal axis. A coil spring 244 is mounted between the fixed structure 236 and pivoted structure 240 for resiliently biasing the latter to move in a direction towards poly-V belt 46 so as to maintain tensioner pulley 242 in tensioning engagement with poly-V belt 46. Belt tensioner 142 maintains poly-V belt 46 in driven engagement with driving pulley 16 and in driving engagement with driven pulleys 122, 124, 126, 128, and 130.

As noted previously, pivoted structure 240 is subject to oscillatory movement about its pivotal axis 250 as a result of torsional, bending, and transitional vibrations transmitted from output shaft 14 through poly-V belt 46 and the engine frame 112. The vibration damper of the present invention significantly helps reduce such oscillatory movement and prolong the life of belt tensioner 142.

FIG. 5 is a vertical sectional view of another embodiment of the torsional vibration damper of the present invention. The function of this embodiment is quite similar to that of the embodiment depicted in FIG. 1, and will now be described in greater detail. The torsional vibration damper, generally indicated at 310, includes a stamped hub 312 which operates to mount the torsional vibration damper to engine crankshaft 314. As can be appreciated, generally indicated at 315 is a conventional key/keyway assembly for predetermining the fixed angular position of the torsional vibration damper on the shaft. The axial extremity of crankshaft 314 comprises an annular flat face 316, and a central protruding portion 318 which protrudes from the center of annular flat face 316. Protruding portion 318 has a peripheral radial wall 320, which together with flat face 316 forms a seat for stamped hub 312. Protruding portion 318 has an inner threaded bore 322 which is adapted to receive threads 324 of bolt 326.

Bolt 326 passes through a cup member 328 and a retaining washer 330. Retaining washer 330 bears against the inner surface 332 of cup member 328, while the outer surface 334 of cup member 328 comes into contact with stamped hub 312 at a portion thereof generally indicated at 336. Bolt 326 is tightly screwed to crankshaft 314 so as to compress retaining washer 330, cup member 328, and stamped hub 312 therebetween.

A resilient member 340 is secured between two concentrically disposed outer and inner rings 342 and 344 similar to the configuration as described in FIG. 1. Rings 344 and 342 are secured respectively to an outer peripheral surface 345 of cup member 328 and an inner surface 347 of a pulley 346, which is adapted to engage endless flexible poly-V belt 348. Pulley 346 includes radially extending annular disk portion 350, extending radially inwards from the portion at which pulley 346 engages poly-V belt 348 and towards a bearing engaging portion 352. Bearing element 354 is disposed between bearing engaging portion 352 and an inner portion 353 of stamped hub 312 which engages radial wall 320 of crankshaft 314. In this embodiment, stamped hub 312 has a portion thereof constituting a protruding portion 356, which is held in spatially separated relation from side portions 358 as similarly disclosed in the description of FIG. 2 with respect to side portions 54 and protruding portion 48.

An upper portion 360 of stamped hub 312 has an elastic member 362 bonded thereto. Elastic member 362 substantially corresponds to elastic member 60 in the first embodiment. Mass element 364 substantially corresponds to mass element 54 in the first embodiment, and is resiliently attached to stamped hub 312 through elastic member 362.

As crankshaft 314 rotates, stamped hub 312, cup member 328, retaining washer 330, and bolt 326, which are all tightly secured thereto, rotate in unison therewith. As cup member 328 receives torsional rotation from crankshaft 314 as a result of the operation of an internal combustion engine, resilient member 340 resiliently transmits torsional rotation to pulley 346. Bearing element 354 restricts relative movement between pulley 346 and cup member 328 to torsional relative movement. It can be appreciated, however, that the relative movement between cup member 328 and pulley 346 is rather slight and occurs mostly when there is large transitions in the operating speed of output crankshaft 314. During such transitions, resilient member 340 effectuates the same type of lag accomplished by resilient 34 in the first embodiment. Resilient member 340, operating in conjunction with bearing element 354 also serves to absorb torsional vibrations of shaft 314 transmitted through stamped hub 312. And, in instances of failure of resilient member 340, protruding portion 356 of stamped hub 312 is permitted to engage side portions 358 so that stamped hub 312 becomes in torsional translating relation with pulley 346.

Finally, it can be appreciated that while the vibration damping assemblies in FIGS. 1 and 5 are shown attached to output shaft 14, they can just as easily be attached to any one or more of the driven shafts shown in FIG. 3. Each accessory driven by the respective driven shaft has its specific natural frequency and dynamic characteristic influenced by the rotational inertia, pulley system geometry, etc. Providing a torsional vibration damper on all driven shafts may further reduce vibratory transmission to belt tensioner 142 and engine frame 112.

While the invention has been disclosed and described in some detail in the drawings and foregoing description, they are to be considered as illustrative and not restrictive in character, as other modifications may readily suggest themselves to persons skilled in the art and within the broad scope of the invention. The invention includes all modifications encompassed within the spirit and scope of the following claims.

What is claimed is:

1. The combination comprising:
   an internal combustion engine including an engine frame and an output shaft rotatable by operation of said internal combustion engine, said output shaft being subject to torsional and bending vibrations resulting from rotation thereof in conjunction with the operation of said internal combustion engine;
   a plurality of driven shafts mounted for rotational movement about parallel axes fixed with respect to said engine frame;
   a plurality of driven pulleys, each of said driven pulleys operatively connected with a corresponding one of said driven shafts;
   a driving pulley for said output shaft;
   an endless flexible poly-V belt trained about said driven and said driving pulleys, said poly-V belt being subject to transitional vibrations from changing rotational speeds of said output shaft;
   a belt tensioner carried by the engine frame in tensioning engagement with said poly-V belt for maintaining said poly-V belt in driven engagement with said driving pulley and in driving engagement with said driven pulleys; and
   a vibration damper assembly operatively connecting said driving pulley with said output shaft for damping said torsional vibrations, said bending vibrations, and said transitional vibrations transmitted from said output shaft through said poly-V belt and said engine frame to said belt tensioner, said vibration damper assembly comprising
   a mounting element, fixed to said output shaft, in torsional transmitting relation therewith;
   bearing means operatively disposed between said driving pulley and said mounting element to restrict relative movement therebetween to torsional relative movement; and
   a resilient member operatively connected between said driving pulley and said mounting element in resilient torsional transmitting relation therebetween.

2. The combination as claimed in claim 1 wherein said resilient member comprises an input end and an output end, said input end being fixed to said mounting element and said output end being fixed to said driving pulley, said resilient member extending radially outward from said input end towards said output end.

3. The combination as claimed in claim 1 further comprising a mass element annularly disposed about said output shaft for further damping said bending and torsional vibrations of said output shaft.

4. The combination as claimed in claim 3 further comprising an annular retaining element fixed to said mounting element for retaining said mass element in a radially spaced, concentric position about said mounting element.

5. The combination as claimed in claim 3, wherein said mass element is fixed to said mounting element through an elastic damping element.

6. The combination as claimed in claim 4 wherein said mass element is connected to said annular retaining element via an elastic damping element.

7. The combination as claimed in claim 1 wherein said resilient member is comprised of rubber.

8. The combination as claimed in claim 6 wherein said elastic damping element is comprised of rubber.

9. The combination as claimed in claim 1 further comprising a back-up means for providing torsional transmission between said mounting element and said driving pulley in the event said resilient member fails in said torsional transmission.

10. The combination as claimed in claim 7 wherein said back-up means comprises:
   at least one protruding portion disposed on said mounting element and a corresponding edge surrounding a slot in said driving pulley, said protruding portion protruding through said slot in a spatially separated relation to said edge, said resilient member impeding relative rotational movement between said driving pulley and said mounting element so as to impede said protruding member from engaging said edge when said resilient member is in proper torsional transmitting relation between said mounting element and said driving pulley, said protruding member being able to engage said edge when said resilient member fails to be in said proper torsional transmitting relation so that said back-up means is in torsional transmitting relation between said mounting element and said driving pulley.

11. The combination as claimed in claim 1 further comprising
   at least one accessory vibration damper assembly, each said accessory vibration damper assembly operatively connecting one of said driven pulleys with said corresponding one of said driven shafts, each said accessory vibration damper assembly damping torsional vibrations, bending vibrations, and transitional vibrations transmitted from said corresponding one of said driven shafts through said poly-V belt and said engine frame to said belt tensioner, each said accessory vibration damper assembly comprising
   a driven mounting element, fixed to said corresponding one of said driven shaft, in torsional transmitting relation therewith;
   driven bearing means operatively disposed between said one of said driven pulleys and said driven mounting element to restrict relative movement therebetween to torsional relative movement; and
   a driven resilient member operatively connected between said one of said driving pulleys and said driven mounting element in resilient torsional transmitting relation therebetween.

12. The combination comprising:
   an internal combustion engine including an engine frame and an output shaft rotatable by operation of said internal combustion engine, said output shaft being subject to torsional vibrations and bending vibrations resulting from rotation thereof in conjunction with the operation of said internal combustion engine;
   a plurality of driven shafts mounted for rotational movement about parallel axes fixed with respect to said engine frame,
   a plurality of driven pulleys, each of said driven pulleys operatively connected to a corresponding one of said driven shafts;
   a driving pulley-for said output shaft;
   an endless flexible poly-V belt trained about said driven and driving pulleys, said poly-V belt being subject to transitional vibrations from changing rotational speeds of said output shaft;

a belt tensioner carried by the engine frame, said belt tensioner comprising: (1) a fixed structure fixed with respect to said engine frame, (2) a movable structure mounted on said fixed structure for movement in one plane (3) a pulley element mounted on said movable structure for rotational movement about a rotational axis, and (4) biasing means for resiliently biasing said movable structure in a direction in said plane toward said poly-V belt for maintaining said pulley element in rotational tensioning engagement with said poly-V belt and for maintaining said poly-V belt in driven engagement with said driving pulley and in driving engagement with said driven pulleys, said movable structure being subject to oscillatory movement with respect to said fixed structure as a result of said torsional vibrations, said bending vibrations, and said transitional vibrations being transmitted to said movable structure from said output shaft through said poly-V belt and said engine frame; and damping means for damping said oscillatory movement of said movable structure, said damping means comprising:

a mounting element, fixed to said output shaft, in torsional transmitting relation therewith;

bearing means operatively disposed between said driving pulley and said mounting element to restrict relative movement therebetween to torsional relative movement; and a resilient member operatively connecting said driving pulley and said mounting element in resilient torsional transmitting relation therebetween.

13. The combination as claimed in claim 12 wherein said resilient member comprises an input end and an output end, said input end being fixed to said mounting element and said output end being fixed to said driving pulley, said resilient member extending radially outward from said input end towards said output end.

14. The combination as claimed in claim 12 further comprising a mass element annularly disposed about said output shaft for damping torsional and bending vibrations of said output shaft.

15. The combination as claimed in claim 14 further comprising an annular retaining element fixed to said mounting element for retaining said mass element in a radially spaced, concentric position about said mounting element.

16. The combination as claimed in claim 15 wherein said mass element is connected to said annular retaining element via an elastic damping element.

17. The combination as claimed in claim 12 wherein said resilient member comprises a rubber material.

18. The combination as claimed in claim 16 wherein said elastic damping element comprises a rubber material.

19. The combination as claimed in claim 12 further comprising a back-up means for providing torsional transmission between said mounting element and said driving pulley in the event said resilient member fails in said torsional transmission.

20. The combination as claimed in claim 19, wherein said backup means comprises:

at least one protruding portion disposed on said mounting element and at least one corresponding edge surrounding a slot in said driving pulley, said protruding portion protruding through said slot in a spatially separated relation to said edge, said resilient member impeding relative rotational movement between said driving pulley and said mounting element so as to impede said protruding member from engaging said edge when said resilient member is in proper torsional transmitting relation between said mounting element and said driving pulley, said protruding member being able to engage said edge when said resilient member fails to be in said proper torsional transmitting relation so that said back-up means becomes in torsional transmitting relation between said mounting element and said driving pulley.

21. The combination as claimed in claim 12 further comprising at least one accessory vibration damper assembly, each said accessory vibration damper assembly operatively connecting one of said driven pulleys with said corresponding one of said driven shafts, each said accessory vibration damper assembly damping torsional vibrations, bending vibrations, and transitional vibrations transmitted from said corresponding one of said driven shafts through said poly-V belt and said engine frame to said belt tensioner, each said accessory vibration damper assembly comprising a driven mounting element, fixed to said corresponding one of said driven shaft, in torsional transmitting relation therewith;

driven bearing means operatively disposed between said one of said driven pulleys and said driven mounting element to restrict relative movement therebetween to torsional relative movement; and a driven resilient member operatively connected between said one of said driving pulleys and said driven mounting element in resilient torsional transmitting relation therebetween.

* * * * *